(12) United States Patent
Purandare

(10) Patent No.: US 12,093,937 B2
(45) Date of Patent: Sep. 17, 2024

(54) SELECTION OF VALIDATORS IN DECENTRALIZED CRYPTOGRAPHIC NETWORK

(71) Applicant: PayPal, Inc., San Jose, CA (US)

(72) Inventor: Sujay Vijay Purandare, Portland, OR (US)

(73) Assignee: PayPal, Inc., San Jose, CA (US)

( * ) Notice: Subject to any disclaimer, the term of this patent is extended or adjusted under 35 U.S.C. 154(b) by 253 days.

(21) Appl. No.: 17/656,824

(22) Filed: Mar. 28, 2022

(65) Prior Publication Data

US 2023/0306418 A1    Sep. 28, 2023

(51) Int. Cl.
*G06Q 20/38* (2012.01)
*G06Q 20/06* (2012.01)
*H04L 9/00* (2022.01)

(52) U.S. Cl.
CPC ....... *G06Q 20/3825* (2013.01); *G06Q 20/065* (2013.01); *G06Q 20/3827* (2013.01); *G06Q 2220/00* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | |
|---|---|---|---|
| 10,841,372 B1 * | 11/2020 | Ram | H04L 65/80 |
| 11,200,569 B1 * | 12/2021 | James | G06Q 20/381 |
| 11,501,370 B1 * | 11/2022 | Paya | G06Q 20/3676 |
| 2021/0334176 A1 * | 10/2021 | Sears | G06F 21/602 |
| 2023/0229813 A1 * | 7/2023 | Mattila | G06F 21/64 |
| | | | 726/26 |

* cited by examiner

*Primary Examiner* — Jamie R Kucab
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to selection of miners/validators in a decentralized cryptographic network. In some embodiments, a request to add a transaction to a blockchain includes a cryptographic signature associated with provision of a second transfer fee, in addition to a first transfer fee, to miners/validators who meet a set of one or more criteria. Disclosed techniques may advantageously allow steering of blockchain requests to a desired subset of miners/validators.

20 Claims, 6 Drawing Sheets

FIG. 3A
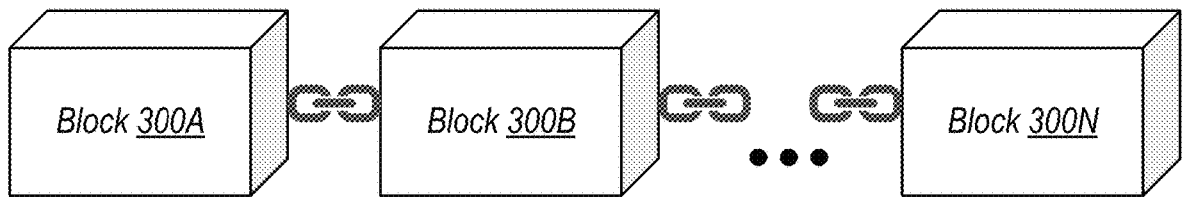
FIG. 3B
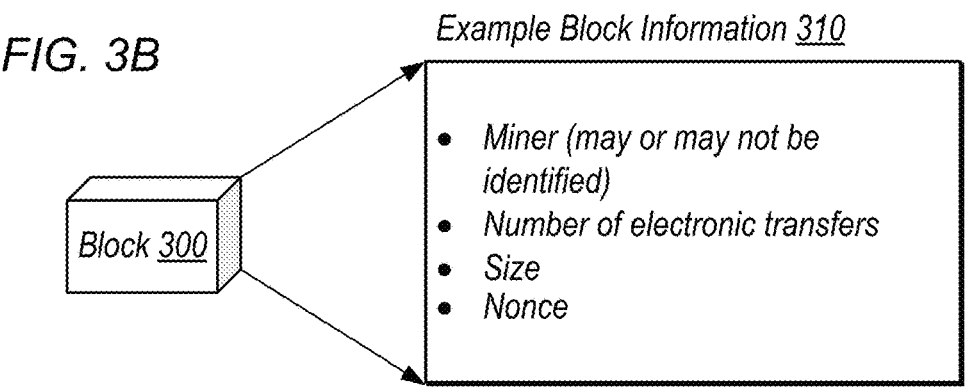
Example Block Information 310
- Miner (may or may not be identified)
- Number of electronic transfers
- Size
- Nonce
FIG. 3C
Example Electronic Transfer Information 320
- Hash of electronic transfer
- Sender network address
- Recipient network address
- Timestamp

SELECTION OF VALIDATORS IN DECENTRALIZED CRYPTOGRAPHIC NETWORK

BACKGROUND

Technical Field

This disclosure relates generally to decentralized cryptographic networks and more particularly to selection of validators in a decentralized cryptographic network.

Description of the Related Art

A "blockchain" refers to technology that facilitates the process of recording and sharing information. It is founded upon the principle of a decentralized network that utilizes cryptographic operations to securely transmit information. As the name suggests, a blockchain stores its information in a sequential train of blocks. Each block may include several different pieces of information, including multiple transactions, timestamps, hash values, etc.

Multiple "nodes" may each have their own copy of the blockchain. When a change occurs, such as an addition of a block to the blockchain, the blockchain reflects this change on node copies of the distributed ledger. Changes to the blockchain may be serviced by validators, which may be referred to as miners for proof of work mechanisms or simply validators for proof of stake mechanisms, for example.

BRIEF DESCRIPTION OF THE DRAWINGS

FIG. 3A is a block diagram illustrating an example blockchain, according to some embodiments.

FIG. 3B is a diagram illustrating example block information, according to some embodiments.

FIG. 3C is a diagram illustrating example electronic transfer information, according to some embodiments.

DETAILED DESCRIPTION

As discussed above, a blockchain is one implementation of a distributed ledger in which multiple "nodes" each have their own copy of the blockchain. Traditionally, an entity submitting a transfer for inclusion on a blockchain has no knowledge of or control over what entit(ies) validate the transfer. For example, Bitcoin transactions are submitted to a mempool and miners compete to solve complex mathematical problems to add the next block to the blockchain. Due to the decentralized nature of the network, any of various miners may succeed. Similarly, in proof-of-stake consensus mechanisms (e.g., Ethereum), any of various validators may be selected, e.g., based on the size of their stake. As used herein, the term "validate" refers to providing proof of some type in order to add a block to a blockchain. This includes, for example, proof-of-work validation by a miner and proof-of-stake validation by a validator. Similarly, a "validator" or "validating entity" may refer to a miner, a validator in a proof-of-stake scheme, etc.

Validator selection in a decentralized cryptographic network may be advantageous in various computing contexts. In some contexts, anonymous entities validating requests may lead to undesirable entities validating transactions, fraudulent transactions, reduced security, etc. For example, some validators may be located in jurisdictions with undesirable policies or regulations, or some validators may use undesirable types of electrical power, e.g., in proof-of-work contexts.

In example embodiments discussed below, intelligent validator selection techniques may allow steering of requests to a desired subset of validators that meet one or more criteria. Disclosed techniques may include a cryptographic signature to indicate provision of an additional transfer fee, via another transaction, when a validator meets the one or more criteria.

Note that various disclosed techniques may allow the network to remain decentralized while allowing steering of transfers to certain validators. In the Bitcoin context, for example, disclosed techniques may be implemented without changing the Bitcoin protocol.

Example Selection of Validators

Figure 1:
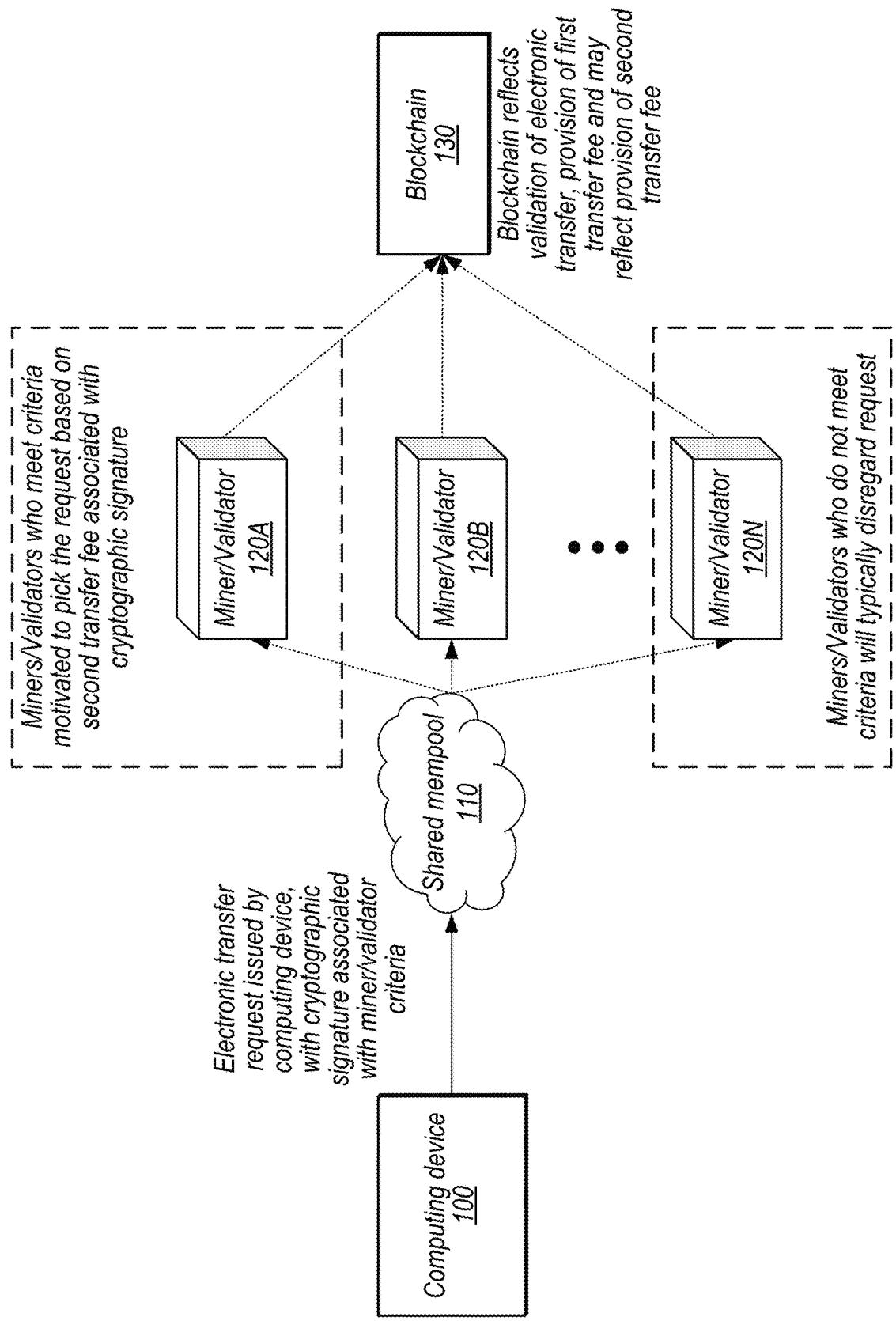
FIG. 1 is a block diagram illustrating an example system configured to select validators in a decentralized cryptographic network, according to some embodiments.

FIG. 1 is a block diagram illustrating an example system configured to select validators in a decentralized cryptographic network, according to some embodiments. In the illustrated embodiment, the system includes computing device 100, shared mempool 110, miners/validators 120A-120N, and blockchain 130.

Computing device 100, in some embodiments, is configured to issue an electronic transfer request that contains a cryptographic signature that indicates that a second fee will be provided, in addition to the initial transfer fee, to a validator that validates the transfer and meets one or more criteria. Computing device 100 may have an electronic transfer application (e.g., a digital wallet) installed. In other embodiments, computing device 100 may be a server computing system, e.g., of a cryptocurrency exchange.

In some embodiments, a cryptographic signature may be implemented through public-key cryptography that uses key pairs (e.g., a public key and a private key). In other embodiments, a cryptographic signature may be implemented through a digital certificate that is issued by a Certificate Authority and verifies the identify of a signer before issuing a certificate. Public-key cryptography and digital certificates are two non-limiting examples of how a cryptographic signature may be implemented and any number of methods for implementing a cryptographic signature may be used.

In some embodiments, multiple different cryptographic signatures may be used depending on whether an electronic transfer requests that a validating entity meet one or more criteria. Similarly, different cryptographic signatures may be used to identify different sets of criteria that validators must meet to receive a supplemental transfer fee.

In some embodiments, a user interface may be used to indicate which cryptographic signature to use for a particular electronic transfer, e.g., based on validator criteria desired by a user.

Shared mempool 110, in some embodiments, is configured to store information for unconfirmed transfers that have not yet been included in a block of the blockchain 130. Validators may retrieve these transactions and attempt to validate them for inclusion on blockchain 130. In some embodiments, each transaction includes a transfer fee that will be provided to the validator that confirms the transaction. There may be a threshold transfer fee (e.g., a default fee or market fee) or a user may enter a custom fee. Traditionally, transfers with a relatively higher fee will be confirmed more rapidly than transfers with a relatively lower fee.

In some embodiments, computing device 100 indicates a relatively low transfer fee for the electronic transfer request. This may result in many validators disregarding the request (e.g., as shown for validator 120N). Other validators may be motivated to pick the request based on the second transfer fee indicated by the cryptographic signature (e.g., as shown for validator 120A). For example, the initial fee plus the second fee may equal or exceed a threshold fee, such that validators who meet criteria for receiving the second fee are motivated to pick the transaction over typical transactions.

Miners/Validators 120A-120N, in some embodiments, may be computing devices and may use generic CPU or GPU circuitry or dedicated mining circuitry. As evidenced by the dotted lines connecting miners/validators 120A-120N, any number of miners/validators may exist that have access to shared mempool 110. As shown, miners/validators 120A-120N may include a subset of miners/validators who meet criteria and are motivated to pick a request based on a second transfer fee associated with the cryptographic signature, and a subset of miners/validators who do not meet the criteria and who will typically disregard a request.

Blockchain 130, in some embodiments, is a decentralized cryptographic chain, e.g., a Bitcoin blockchain. Blockchain 130 may be configured as a distributed chain in which multiple "nodes" each have their own copy of the chain of confirmed blocks. As shown, when a miner/validator who meets the criteria validates the electronic transfer, the blockchain reflects provision of the first transfer fee and the second transfer fee (note that in other embodiments, the second transfer fee may be provided via another network or blockchain, as discussed below with reference to FIGS. 4A-4C).

In some embodiments, blockchain 130 may be any suitable type of blockchain, including public or private, either of which may be permissioned, permissionless, hybrid, etc. Blockchain 130 may also be a consortium or a federated blockchain. Blockchain 130 may be used for any number of applications, including asset transfers, monitoring supply chains, digital IDs, digital voting, compliance, copyright/royalty protection, medical recordkeeping, managing legal documents such as wills, managing Internet of Things (IoT) devices, and tracking real-world items such as food, prescriptions drugs, hazardous materials, etc.

Disclosed techniques may advantageously allow steering of requests to a desired subset of miners/validators in a decentralized cryptographic network.

Example Technique for Selecting Validators

Figure 2:
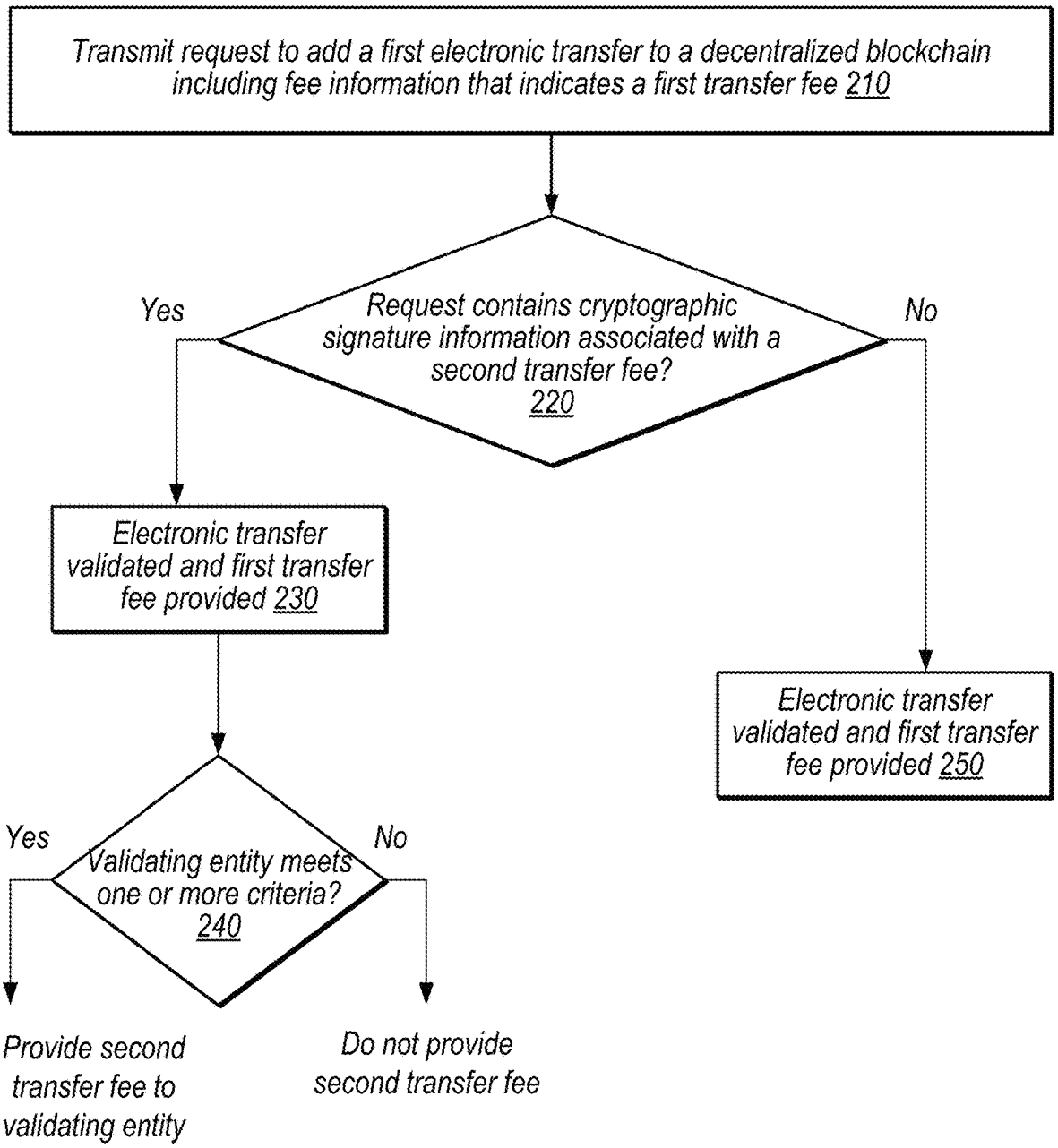
FIG. 2 is a flow diagram illustrating a detailed example technique for selecting validators in a decentralized cryptographic network, according to some embodiments.

FIG. 2 is a diagram illustrating a detailed example flow for selecting miners/validators in a decentralized cryptographic network, according to some embodiments.

At 210, in the illustrated embodiment, a request is transmitted to add a first electronic transfer to a decentralized blockchain. The request includes fee information that indicates a first transfer fee. In some embodiments, the request is added to a shared mempool from where miners/validators may select which transactions to add to a block.

At 220, in the illustrated embodiment, it is determined whether the request contains cryptographic signature information that is associated with a second transfer fee. For a request that contains such cryptographic signature information, flow proceeds to 230. For a request that does not contain cryptographic signature information, flow proceeds to 240.

At 230, in the illustrated embodiment, an electronic transfer is validated and a first transfer fee is provided. In some embodiments, a second transfer fee may be provided to a validating entity meeting one or more criteria.

At 240, in the illustrated embodiment, it is determined whether a validating entity meets one or more criteria. For a validating entity that meets the one or more criteria, a second transfer fee is provided to the validating entity. For a validating entity that does not meet one or more criteria, a second transfer fee is not provided. If the first transfer fee is low, this may cause miners/validators who do not meet the criteria to disregard the transaction.

At 250, in the illustrated embodiment, an electronic transfer is validated and a first transfer fee is provided. This may correspond to traditional validation of the electronic transfer.

In some embodiments, determining whether a validating entity meets the one or more criteria includes communicating with an external computing system (e.g., a system of the bitcoin mining council) to verify at least one of the one or more criteria. In these embodiments, the external system may verify whether miners/validators meet the criteria, which may include authenticating miners/validators. In some embodiments, verification of criteria may be achieved through communication over a wide area network (WAN), such as the internet, local area network (LAN) connected to a WAN, satellite link, etc. In other embodiments, the computing system transmitting the request may validate one or more criteria.

In some embodiments, the one or more criteria include public cryptographic identification of the validating entity, on the blockchain. In these embodiments, a public cryptographic identifier may be embedded in the validating entity's signature. In these embodiments, miners/validators who choose to stay anonymous may not be provided with the second fee.

In some embodiments, the one or more criteria may include electric power type used by the validating entity to validate electronic transfers, location of the validating entity, etc. For example, green electric power may be encouraged or certain locations may have rules or practices that are considered undesirable and may be avoided.

In some embodiments, the second electronic transfer fee is provided via a 1:N multi-signature transaction that is cryptographically signable by multiple identified potential validating entities that satisfy the one or more criteria (this may involve pre-identification of entities that satisfy the criteria). In some embodiments, the multi-signature transfer is an unspent transaction output (UTXO) of a bitcoin transaction that includes the first electronic transfer. In other embodiments, the second electronic transfer fee may be provided via a second layer protocol for the blockchain (e.g., a lightning network). Detailed example techniques for providing the second fee are discussed below with reference to FIGS. 4A-4C.

Example Block and Transaction Information

FIG. 3A is a diagram illustrating an example blockchain, according to some embodiments. FIG. 3B illustrates an example block that may be included in the blockchain and FIG. 3C illustrates an example electronic transfer that may be included in a block.

In the illustrated embodiment of FIG. 3A, blocks 300A-300N are part of a sequential train of blocks, where the blocks are cryptographically linked to form the chain. In some embodiments, each block includes several different pieces of information (discussed below) that may identify the validating entity.

FIG. 3B is a diagram illustrating example block information, according to some embodiments. In the illustrated embodiment, block 300 includes example block information 310 that may be found in proof-of-work mechanisms, such as: a miner (who may or may not be identified), a number of electronic transfers, a size, and a nonce. In some embodiments, block 300 includes other relevant information, such as a hash of the current block, a hash of the previous block, validating entity's network address, timestamp, height, Merkle root, block reward, transfer fee reward, etc.

In some embodiments, a block reward of a block is the reward provided to a validator upon successful addition of a block to the blockchain. The block reward may be provided in the same currency as the blockchain currency.

In some embodiments, a transfer fee reward of a block is the accumulation of all electronic transfer fees of all electronic transfers within a block that is provided to a validator upon successful addition of a block containing electronic transfers to the blockchain. The transfer fee reward may be provided in the same currency as the blockchain currency. In some embodiments, a successful validator receives both a block reward and a transfer fee reward for a given block.

In some embodiments, the hash of a block (also known as a "block hash") is a fixed-length string that uniquely identifies a block and its contents. A hashing function is used to generate the block hash and refers to the transformation of input data of any length into a string of a fixed size, which may be performed by a specific algorithm or function (e.g., Secure Hashing Algorithm 256 bits (SHA-256)). Such an algorithm may be a one-way cryptographic function so that the original data cannot be retrieved via decryption. For example, in the Bitcoin context, a block hash may be generated by hashing the block header using SHA-256 twice. In other blockchain contexts, other types of hashing algorithms may be used, such as KECCAK-256 as one example.

In some embodiments, a nonce is a number only used once. In the context of cryptographic algorithms, the nonce is a number added to a block hash in a blockchain that, when rehashed, meets predefined difficulty level restrictions. In proof of work contexts, the nonce may be the solution for which miners/validators are solving complex mathematical problems.

In some embodiments, a validating entity's network address in a block is a logical or physical address that uniquely identifies a validating entity's network node or device.

In some embodiments, a timestamp of a block is a piece of unique serial metadata stored in a block that determines the time at which the block was validated by a validating entity.

In some embodiments, the height of a block is the number of blocks preceding the block in the blockchain.

In some embodiments, the size of a block refers to the number of bytes of information stored in the block.

In some embodiments, the Merkle root of a block is the hash of all the hashes of all the electronic transfers that are part of a block in a blockchain.

Note that proof-of-stake mechanisms may include similar block information, such as: a validator (who may or may not be identified), a number of electronic transfers, a size, etc.

FIG. 3C is a diagram illustrating example electronic transfer information, according to some embodiments. In the illustrated embodiment, example electronic transfer information 320 includes: a hash of the electronic transfer, a sender network address, a recipient network address, and a timestamp. In some embodiments, example electronic transfer information 320 includes other relevant information, such as a value amount, transfer fee amount, transfer fee rate, etc.

In some embodiments, a hash of an electronic transfer is a fixed-length string that uniquely identifies an electronic transfer and its contents. The hash of an electronic transfer may be generated using a hashing function in a similar manner to a block hash described above.

In some embodiments, a sender network address of an electronic transfer is a logical or physical address that uniquely identifies a sender's network node or device.

In some embodiments, a recipient network address of an electronic transfer is a logical or physical address that uniquely identifies a recipient's network node or device.

In some embodiments, a value amount of an electronic transfer is the amount of blockchain currency being transferred from the sender's network address to the recipient's network address as part of the electronic transfer.

In some embodiments, a transfer fee amount of an electronic transfer is the fee paid to a validating entity for including the electronic transfer in a block to add to the blockchain.

In some embodiments, a transfer fee rate of an electronic transfer is the fee amount paid per unit of block size to a validating entity for including the electronic transfer in a block to add to the blockchain. The fee amount paid per unit of block size may appear as sat/B (Satoshi/Byte), sat/WU (Satoshi/Weight Unit), sat/vByte (Satoshi/Virtual Byte), etc.

In some embodiments, various other fields may be included, such as lock time, scripts, confirmations, etc.

Note that various examples herein identify information which may be contained in blocks and electronic transfers, but these examples are discussed for purposes of explanation and are not intended to limit the scope of the present disclosure. In other embodiments, any of various fields may be included.

Example Transaction Techniques for Supplemental Fee

The following discussion sets out various example techniques to providing a second transfer fee, e.g., in addition to a traditional first fee. Note that some of the disclosed techniques may be trustless in the sense that the validator need not trust that the transferor will pay the supplemental transfer fee. As discussed in detail below, a second transfer or transaction for the supplemental fee may be included in the primary transaction, an independent transaction, and may even occur via a different network.

Figure 4A:
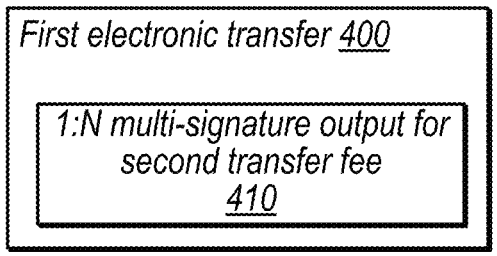
FIG. 4A is a block diagram illustrating an example first electronic transfer with an embedded multi-signature electronic transfer, according to some embodiments.

FIG. 4A is a block diagram illustrating an example first electronic transfer with an embedded multi-signature electronic transfer, according to some embodiments. In the illustrated embodiment, a 1:N multi-signature output for a second transfer fee 410 is embedded in the first electronic transfer 400. For example, the multi-signature output may be an unspent transaction output (UTXO) of a bitcoin transaction that includes the first electronic transfer.

In some embodiments, a 1:N multi-signature output allows for any one of N different entities to approve an transfer. For example, in the context of Bitcoin, N different pre-identified miners/validators may meet the one or more criteria and can sign the 1:N transfer for confirmation.

In some embodiments, the list of entities that have been verified to meet the one or more criteria is generated through communication, via a wide area network, with an external computing system (e.g., Bitcoin mining council) to verify at least one of the one or more criteria. In other embodiments, the list may be generated internally, miners/validators may be authenticated dynamically, etc.

Figure 4B:
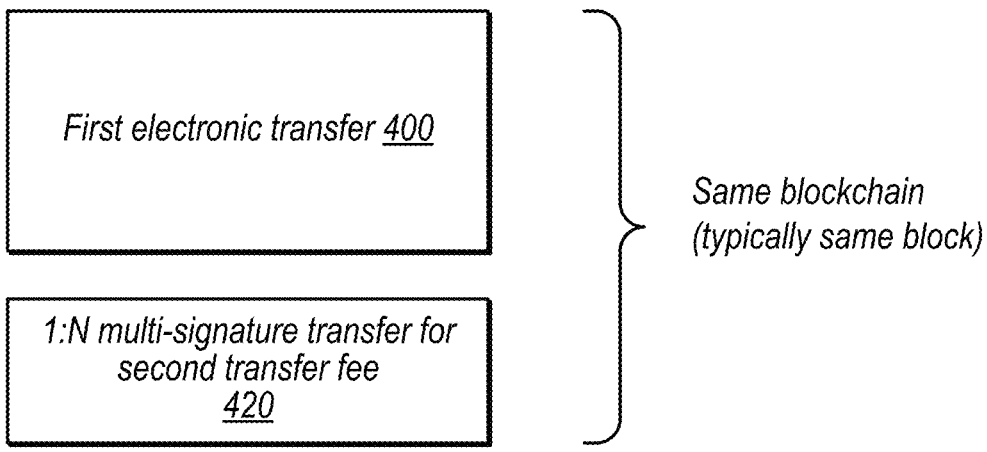
FIG. 4B is a diagram illustrating an example first electronic transfer and a separate multi-signature second electronic transfer on the same blockchain, according to some embodiments.

FIG. 4B is a block diagram illustrating an example first electronic transfer with a separate multi-signature electronic transfer, according to some embodiments. In the illustrated embodiment, a 1:N multi-signature transfer for a second transfer fee 420 is separate from the first electronic transfer 400. In some embodiments, the first electronic transfer 400 and 1:N multi-signature transfer for the second transfer fee 420 are included in the same blockchain, and in some cases, in the same block.

Figure 4C:
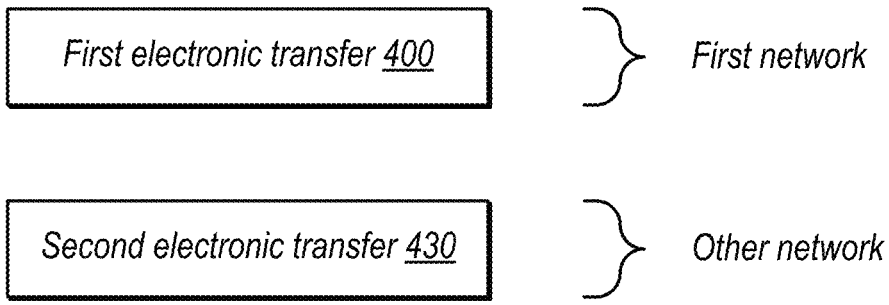
FIG. 4C is a diagram illustrating example first and second electronic transfers validated via separate networks, according to some embodiments.

FIG. 4C is a block diagram illustrating example first and second electronic transfers validated via separate networks, according to some embodiments. In the illustrated embodiment, first electronic transfer 400 is confirmed via a first network and second electronic transfer 430 is confirmed via another network. In some embodiments, the first network is a Bitcoin network and the second network is the Lightning network (a second layer protocol for Bitcoin).

The Lightning network may be a second layer protocol applied to Bitcoin electronic transfers that utilizes micropayment channels to conduct electronic transfers more efficiently. For example, a second electronic transfer that is conducted off-chain, via the Lightning network, may be faster, less costly, and more readily validated relative to an electronic transfer conducted on-chain.

In some embodiments, a second electronic transfer may be conducted on the Lightning network because of the advantages described above, because of congestion on the first (on-chain) network, because of reduced associated transfer fees, etc.

Example Methods

Figure 5:
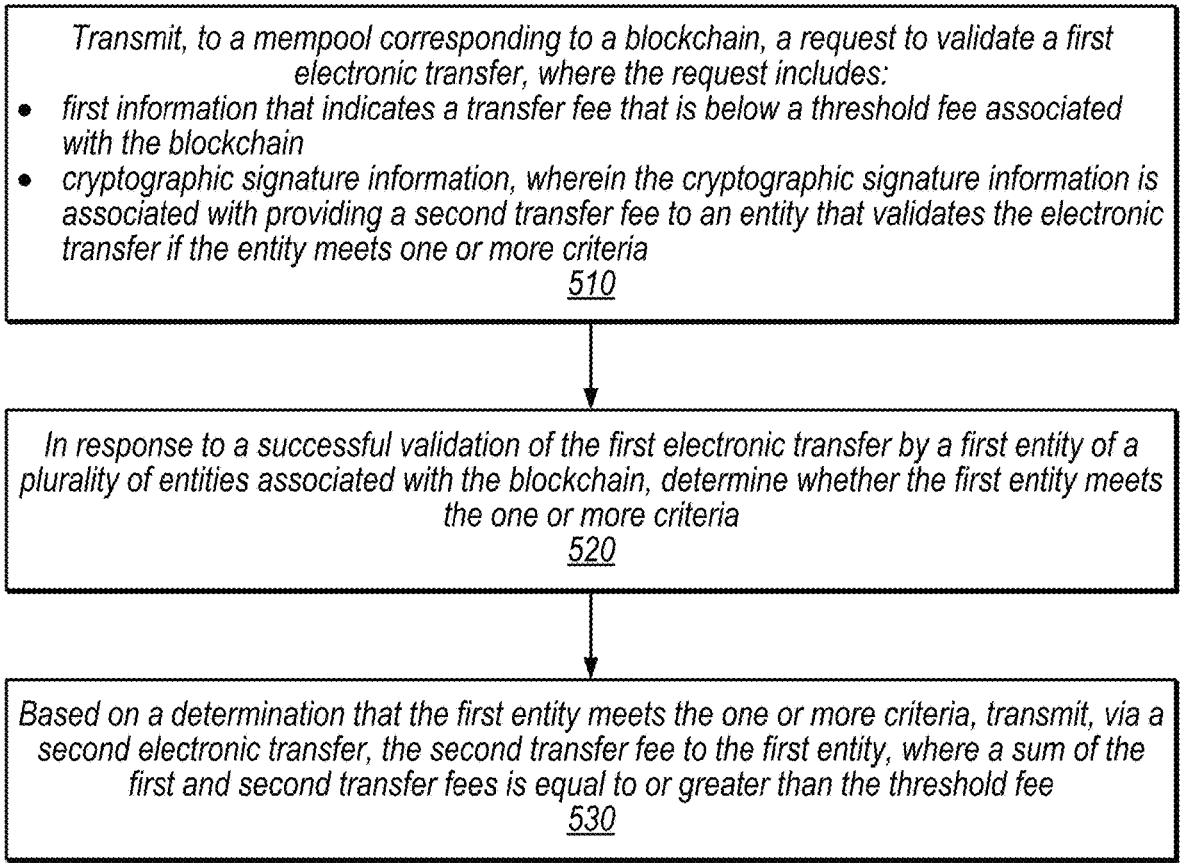
FIG. 5 is a flow diagram illustrating an example method for selecting validators in a decentralized cryptographic network, according to some embodiments.

FIG. 5 is a flow diagram illustrating a method for selecting validators in a decentralized cryptographic network, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 510, in the illustrated embodiment, a computing system transmits a request to validate a first electronic transfer to a mempool corresponding to a blockchain. The request includes first information that indicates a first transfer fee that is below a threshold fee associated with the blockchain and cryptographic signature information that is associated with providing a second transfer fee to an entity that validates the electronic transfer if the entity meets one or more criteria. The threshold fee may be a default fee or a market fee associated with the blockchain, for example. In some embodiments, the threshold fee may be automatically populated by a "wallet" application.

In some embodiments, the mempool stores information on unconfirmed transfers that have not yet been included in a block and that may be selected by a subset of validators.

At 520, in the illustrated embodiment, in response to a successful validation of the first electronic transfer by a validating entity of a plurality of entities associated with the blockchain, the computing system determines whether the validating entity meets the one or more criteria.

In some embodiments, the one or more criteria may include the electric power type used by the validating entity to validate electronic transfers, location of the validating entity, public cryptographic identification of the validating entity, etc. In some embodiments, the determining that the first entity meets the one or more criteria includes communicating, via a wide area network, with an external computing system to verify at least one of the one or more criteria. In some embodiments, the method includes generating a list of entities that have been verified to meet the one or more criteria.

In some embodiments, the computing system determines that the validating entity meets the one or more criteria by verifying the address associated with the validating entity matches an address corresponding to miners/validators that have been approved as meeting the criteria. In some embodiments, miners/validators that have been approved as meeting the criteria may already be included on an internal list of the computing system, a list maintained externally to the computing system (e.g., by the Bitcoin mining council), etc. For example, an internal list of addresses of entities associated with certain regions may be maintained by the computing system. As another example, an internal or external list of addresses of entities that utilize green electric power may be maintained.

In some embodiments, the computing system may authenticate whether the validating entity meets the one or more criteria by requesting identifying information from the validating entity after the electronic transfer has been validated, but prior to providing the second transfer fee. The identifying information may include any type of information indicating that the validating entity meets the one or more criteria, and that may be authenticated by the computing system. As discussed above, pre-determined validators may be included as potential signers on multi-signature transactions for the second fee.

At 530, in the illustrated embodiment, based on the determination that the validating entity meets the one or more criteria, the computing system transmits, via a second electronic transfer, the second transfer fee to the validating entity, wherein a sum of the first and second transfer fees is equal to or greater than the threshold fee.

In some embodiments, the second transfer fee is provided via a 1:N multi-signature output that is embedded in the first electronic transfer. The multi-signature transfer may be an unspent transaction output (UTXO) of a bitcoin transaction that includes the first electronic transfer. In other embodiments, the second transfer fee may be provided via a 1:N multi-signature output that is separate to the first electronic transfer.

In some embodiments, the second transfer fee is provided through a second electronic transfer, via a second layer protocol for the blockchain (e.g., a lightning network).

In some embodiments, the blockchain is a Bitcoin blockchain and a block contains information that specifies at least the following: hash of the block, validating entity's network address, timestamp, size, nonce, height, and electronic transfer volume. In some embodiments, a given blockchain block includes multiple electronic transfers that contain information that specifies at least the following: value amount, hash of electronic transfer, sender network address, recipient network address, and timestamp.

In some embodiments, validation of the electronic transfer is based on a proof of work mechanism. In some embodiments, validation of the electronic transfer is based on a proof of stake mechanism.

Figure 6:
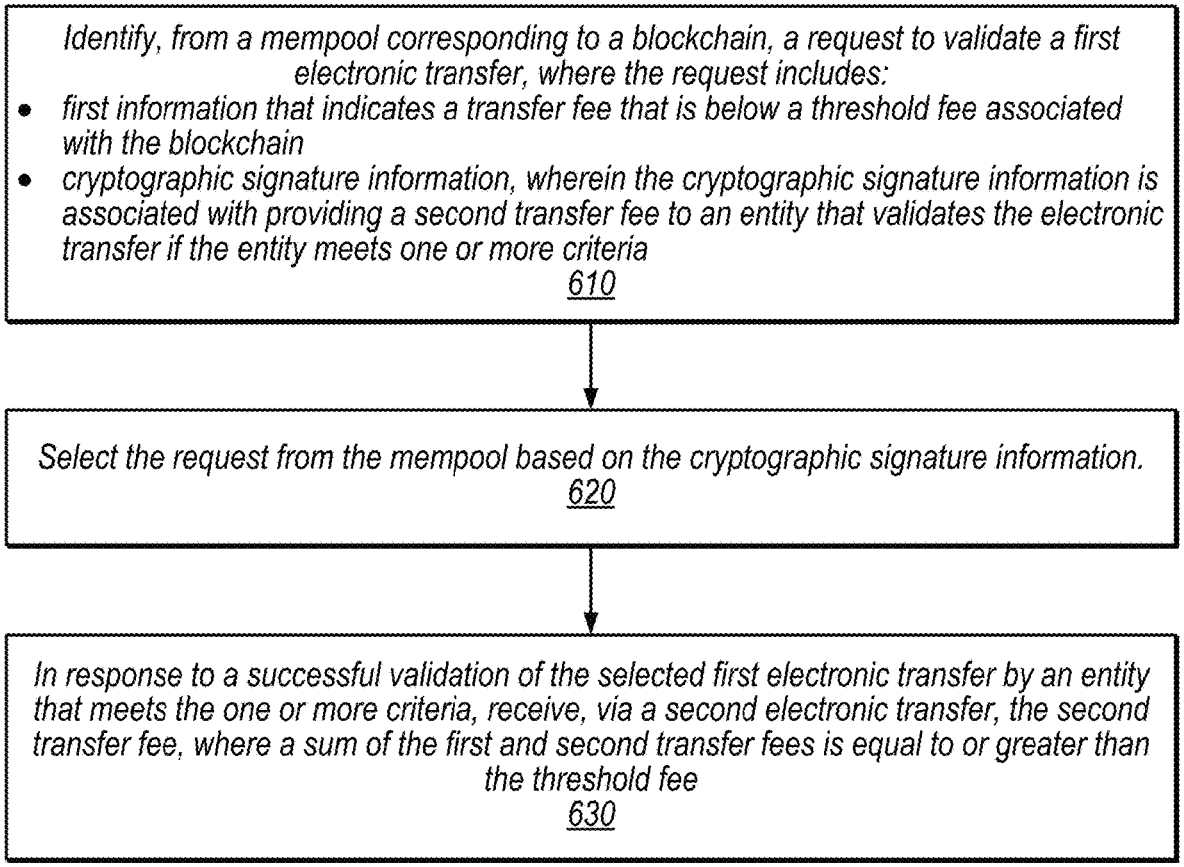
FIG. 6 is a flow diagram illustrating an example method for selecting requests from a memory pool, according to some embodiments.

FIG. 6 is a flow diagram illustrating a method for a miner/validator to identify, select, and validate a request in a decentralized cryptographic network, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 610, in the illustrated embodiment, a miner/validator computing system identifies a request to validate a first electronic transfer from a mempool corresponding to a blockchain. The request includes first information that indicates a first transfer fee that is below a threshold fee associated with the blockchain and cryptographic signature information that is associated with providing a second transfer fee to an entity that validates the electronic transfer if the entity meets one or more criteria. The threshold fee may be a default fee or a market fee associated with the blockchain, for example.

In some embodiments, the miner/validator accesses the mempool, which stores information on unconfirmed transfers that have not yet been included in a block, and selects any number of requests to validate. In some embodiments, the validator may specifically choose to select requests which indicate a transfer fee that is below a threshold fee because the requests include cryptographic signature information that is associated with providing a second transfer fee to those entities that validate the electronic transfer and meet one or more criteria.

At 620, in the illustrated embodiment, the miner/validator selects, from the mempool, the request based on the cryptographic information.

In some embodiments, the miner/validator may specifically select requests that have significantly lower transfer fees than other requests but contain cryptographic signature information that is associated with providing a second transfer fee to an entity that validates the electronic transfer and meets one or more criteria. The miner/validator may be aware, before choosing to select the request, that they meet the one or more criteria associated with the cryptographic signature information. In such embodiments, miners/validators who meet the one or more criteria may be motivated to pick the request based on the second transfer fee associated with the cryptographic signature, despite the first transfer fee being lower than a threshold fee.

At 630, in the illustrated embodiment, in response to a successful validation of the selected first electronic transfer by a miner/validator that meets the one or more criteria, the validator receives, via a second electronic transfer, the second transfer fee. In the illustrated example, the sum of the first and second transfer fees is equal to or greater than the threshold fee.

In some embodiments, the miner/validator may receive the second transfer fee via a 1:N multi-signature output that is embedded in the first electronic transfer. The multi-signature transfer may be an unspent transaction output (UTXO) of a bitcoin transaction that includes the first electronic transfer. In other embodiments, the miner/validator may receive the second transfer fee via a 1:N multi-signature output that is separate from the first electronic transfer.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

In general, any of the services or functionalities described in this disclosure can be performed by a host computing device, which is any computer system that is capable of connecting to a computer network. A given host computing device can be configured according to any known configuration of computer hardware. A typical hardware configuration includes a processor subsystem, memory, and one or more I/O devices coupled via an interconnect. A given host computing device may also be implemented as two or more computer systems operating together.

The processor subsystem of the host computing device may include one or more processors or processing units. In some embodiments of the host computing device, multiple instances of a processor subsystem may be coupled to the system interconnect. The processor subsystem (or each processor unit within a processor subsystem) may contain any of various processor features known in the art, such as a cache, hardware accelerator, etc.

The system memory of the host computing device is usable to store program instructions executable by the processor subsystem to cause the host computing device to perform various operations described herein. The system memory may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read-only memory (PROM, EEPROM, etc.), and so on. Memory in the host computing device is not limited to primary storage. Rather, the host computing device may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the host computing device may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network), or other devices (e.g., graphics, user interface devices.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A system, comprising:
   one or more processors; and
   one or more memories having program instructions stored thereon that are executable by the one or more processors to:
      transmit, to a mempool corresponding to a blockchain, a request to validate a first electronic transfer, wherein the request includes:
         first information that indicates a first transfer fee that is below a threshold fee associated with the blockchain; and
         cryptographic signature information, wherein the cryptographic signature information is associated with providing a second transfer fee to an entity that validates the first electronic transfer if the entity meets one or more criteria;
      in response to a successful validation of the first electronic transfer by a first entity of a plurality of entities associated with the blockchain, determine whether the first entity meets one or more criteria, wherein the first entity is a miner or validator associated with the blockchain; and
      based on a determination that the first entity meets the one or more criteria, transmit, via a second electronic transfer, the second transfer fee to the first entity, wherein a sum of the first and second transfer fees is equal to or greater than the threshold fee.

2. The system of claim 1, wherein the determination of whether the first entity meets the one or more criteria includes communication, via a wide area network, with an external computing system to verify at least one of the one or more criteria.

3. The system of claim 1, wherein the one or more criteria include one or more of the following criteria:
   electric power type used by the first entity to validate electronic transfers; and
   location of the first entity.

4. The system of claim 1, wherein the second electronic transfer is a multi-signature electronic transfer on the blockchain that is cryptographically signable by multiple identified potential validating entities that satisfy the one or more criteria, including the first entity.

5. A method, comprising:
transmitting, by a computing system to a mempool corresponding to a blockchain, a request to validate a first electronic transfer, wherein the request includes:
first information that indicates a first transfer fee that is below a threshold fee associated with the blockchain; and
cryptographic signature information, wherein the cryptographic signature information is associated with providing a second transfer fee to an entity that validates the first electronic transfer if the entity meets one or more criteria;
in response to a successful validation of the first electronic transfer by a first entity of a plurality of entities associated with the blockchain, the computing system determining whether the first entity meets one or more criteria, wherein the first entity is a miner or validator associated with the blockchain; and
based on determining that the first entity meets the one or more criteria, transmitting, via a second electronic transfer, the second transfer fee to the first entity, wherein a sum of the first and second transfer fees is equal to or greater than the threshold fee.

6. The method of claim 5, wherein the determining that the first entity meets the one or more criteria includes communicating, via a wide area network, with an external computing system to verify at least one of the one or more criteria.

7. The method of claim 5, wherein the one or more criteria include public cryptographic identification, via the blockchain, of the first entity.

8. The method of claim 5, wherein the one or more criteria include one or more of the following criteria:
electric power type used by the first entity to validate electronic transfers; and
location of the first entity.

9. The method of claim 5, further comprising:
generating a list of entities that have been verified to meet the one or more criteria.

10. The method of claim 5, wherein the second electronic transfer occurs via a second layer protocol for the blockchain.

11. The method of claim 5, wherein the second electronic transfer is a multi-signature electronic transfer on the blockchain that is cryptographically signable by multiple identified potential validating entities that satisfy the one or more criteria, including the first entity.

12. The method of claim 11, wherein the multi-signature electronic transfer is an unspent transaction output (UTXO) of a bitcoin transaction that includes the first electronic transfer.

13. The method of claim 5, wherein the blockchain is a Bitcoin blockchain and a block contains information that specifies at least the following:
hash of the block;
validating entity's network address;
timestamp;
size;
nonce;
height; and
electronic transfer volume.

14. The method of claim 13, wherein a given blockchain block includes multiple electronic transfers that contain information that specifies at least the following:
value amount;
hash of electronic transfer;
sender network address;
recipient network address; and
timestamp.

15. The method of claim 5, wherein validation of the first electronic transfer is based on a proof of work mechanism.

16. The method of claim 5, wherein validation of the first electronic transfer is based on a proof of stake mechanism.

17. A non-transitory computer-readable medium having instructions stored thereon that are executable by a computing device to perform operations comprising:
transmitting, to a mempool corresponding to a blockchain, a request to validate a first electronic transfer, wherein the request includes:
first information that indicates a first transfer fee that is below a threshold fee associated with the blockchain; and
cryptographic signature information, wherein the cryptographic signature information is associated with providing a second transfer fee to an entity that validates the first electronic transfer if the entity meets one or more criteria;
in response to a successful validation of the first electronic transfer by a first entity of a plurality of entities associated with the blockchain, determining whether the first entity meets one or more criteria, wherein the first entity is a miner or validator associated with the blockchain; and
based on a determination that the first entity meets the one or more criteria, transmitting, via a second electronic transfer, the second transfer fee to the first entity, wherein a sum of the first and second transfer fees is equal to or greater than the threshold fee.

18. The non-transitory computer readable medium of claim 17, wherein the determining whether the first entity meets the one or more criteria includes communicating, via a wide area network, with an external computing system to verify at least one of the one or more criteria.

19. The non-transitory computer readable medium of claim 17, wherein the one or more criteria include one or more of the following criteria:
electric power type used by the first entity to validate electronic transfers; and
location of the first entity.

20. The non-transitory computer readable medium of claim 17, wherein the second electronic transfer is a multi-signature electronic transfer on the blockchain that is cryptographically signable by multiple identified potential validating entities that satisfy the one or more criteria, including the first entity.

* * * * *